(12) United States Patent
Hayduchok et al.

(10) Patent No.: US 8,875,139 B2
(45) Date of Patent: Oct. 28, 2014

(54) METHOD AND PROCESS FOR TRACKING DOCUMENTS BY MONITORING EACH DOCUMENT'S ELECTRONIC PROCESSING STATUS AND PHYSICAL LOCATION

(75) Inventors: George L. Hayduchok, Westampton, NJ (US); Eric P. Minbiole, Cherry Hill, NJ (US); Michael W. Vasey, Flower Mound, TX (US)

(73) Assignee: Mavro Imaging, LLC, Westampton, NJ (US)

( * ) Notice: Subject to any disclaimer, the term of this patent is extended or adjusted under 35 U.S.C. 154(b) by 982 days.

(21) Appl. No.: 12/847,567

(22) Filed: Jul. 30, 2010

(65) Prior Publication Data

US 2012/0030678 A1 Feb. 2, 2012

(51) Int. Cl.
*G06F 21/00* (2013.01)
*G06Q 10/08* (2012.01)

(52) U.S. Cl.
CPC .......... *G06Q 10/0833* (2013.01); *G06Q 10/087* (2013.01)
USPC ................. 718/101; 705/45; 705/30; 705/37; 705/39

(58) Field of Classification Search
CPC ............................ G06Q 20/382; G06F 21/123
USPC .................. 382/100, 176, 137, 282; 718/101; 705/45, 35, 408, 3, 342, 30; 358/1.15, 358/1.16; 235/379; 700/220, 224
See application file for complete search history.

(56) References Cited

U.S. PATENT DOCUMENTS

| | | | | |
|---|---|---|---|---|
| 563,198 | A * | 6/1896 | Milsted | 194/294 |
| 5,602,377 | A * | 2/1997 | Beller et al. | 235/462.15 |
| 5,777,883 | A * | 7/1998 | Lau et al. | 700/220 |
| 6,058,413 | A * | 5/2000 | Flores et al. | 718/101 |
| 6,658,430 | B1 * | 12/2003 | Harman | 1/1 |
| 6,956,662 | B1 * | 10/2005 | Kamimura | 358/1.15 |
| 7,021,528 | B2 * | 4/2006 | Igval et al. | 235/379 |
| 7,453,594 | B2 * | 11/2008 | Bessho | 358/1.16 |
| 8,028,229 | B2 * | 9/2011 | Bailor et al. | 715/255 |
| 8,250,103 | B2 * | 8/2012 | Ohsawa | 707/792 |
| 8,275,715 | B2 * | 9/2012 | Caruso et al. | 705/45 |
| 8,311,945 | B2 * | 11/2012 | Hawkins et al. | 705/45 |
| 8,321,314 | B2 * | 11/2012 | Larsen et al. | 705/35 |
| 8,346,574 | B2 * | 1/2013 | Chirica et al. | 705/3 |
| 8,351,677 | B1 * | 1/2013 | Oakes et al. | 382/137 |
| 2002/0176598 | A1 * | 11/2002 | Knowles et al. | 382/100 |
| 2005/0036681 | A1 * | 2/2005 | Lenoir | 382/176 |
| 2008/0062472 | A1 * | 3/2008 | Garg et al. | 358/402 |

(Continued)

FOREIGN PATENT DOCUMENTS

EP 1650713 A2 * 4/2006
EP 1439496 B1 * 12/2009

*Primary Examiner* — Thomas Lee
*Assistant Examiner* — Auriel Prifti
(74) *Attorney, Agent, or Firm* — Donald R. Piper, Jr.; Dann Dorfman Herrell & Skillman, PC

(57) ABSTRACT

A method and apparatus are provided for tracking documents. The documents are tracked by simultaneously monitoring each document's electronic processing status and physical location. Determinations are made whether specific combinations of electronic processing states and physical locations are valid and whether specific movements of documents are permitted. Invalid combinations or movements are reported to a reporting station. The preparation of batches of documents prior to scanning may be monitored and operator metrics related to the batch prep process may be tracked. Exception documents rejected during document processing may be monitored to enable retrieval of such documents.

27 Claims, 11 Drawing Sheets

(56) References Cited

U.S. PATENT DOCUMENTS

| | | | |
|---|---|---|---|
| 2008/0163364 A1* | 7/2008 | Ferlitsch | 726/21 |
| 2008/0247629 A1* | 10/2008 | Gilder et al. | 382/137 |
| 2009/0048704 A1* | 2/2009 | Redford | 700/224 |
| 2009/0307136 A1* | 12/2009 | Hawkins | 705/45 |
| 2010/0153310 A1* | 6/2010 | Huebler | 705/408 |
| 2010/0153952 A1* | 6/2010 | Linder | 718/101 |
| 2010/0174632 A1* | 7/2010 | Piedra et al. | 705/35 |
| 2010/0262522 A1* | 10/2010 | Anderson et al. | 705/30 |
| 2010/0310192 A1* | 12/2010 | Kuchibhotla et al. | 382/282 |
| 2010/0312705 A1* | 12/2010 | Caruso et al. | 705/45 |
| 2011/0135160 A1* | 6/2011 | Sagan et al. | 382/108 |
| 2011/0153515 A1* | 6/2011 | Pitzo et al. | 705/342 |

\* cited by examiner

Figure 3

| Batch ID | Electronic Status | Previous Location | Current Location | Time | Status |
|---|---|---|---|---|---|
| 115 | - | - | Scanner | 1 minute | OK |
| 114 | Process 1 | - | Scanner | 5 minutes | OK |
| 113 | Process 3 | - | Scanner | 10 minutes | OK |
| 112 | - | - | Scanner | 20 minutes | Error |
| 111 | Process 5 | Scanner | Staging | 30 minutes | OK |
| 110 | - | - | Staging | - | Error |
| 109 | Complete | Scanner | Staging | 1 hour | OK |
| 108 | Complete | Staging | Storage | 2 hours | OK |
| 107 | Process 5 | Staging | Storage | 3 hours | Error |
| 106 | Complete | Staging | Storage | 13 days | OK |
| 105 | Complete | Staging | Storage | 14 days | OK |
| 104 | Complete | Storage | Shredding | 14 days | Error |
| 103 | Complete | Storage | Shredding | 16 days | OK |
| 102 | Complete | Staging | Shredding | 16 days | Error |
| 101 | Complete | Staging | Storage | 21 days | Error |

Figure 4

| Batch ID | Current Location | Checkout Status | User | Notes | Time | Status |
|---|---|---|---|---|---|---|
| 204 | Staging | No | - | - | - | OK |
| 203 | Staging | Yes | Nadine | Research amount | 2 hours | OK |
| 202 | Staging | No | - | - | - | OK |
| 201 | Scanner | Yes | Danielle | - | - | Error |
| 200 | Staging | Yes | Laura | Customer inquiry | 25 hours | Error |

| Source Batch | Virtual Batch | Status |
|---|---|---|
| 1001 | 1001-1 | Process 3 |
| 1001 | 1001-2 | Process 4 |
| 1001 | 1001-3 | Complete |
| 1001 | 1001-4 | Complete |
| 1001 | 1001-5 | Complete |
| 1002 | 1002-1 | Complete |
| 1002 | 1002-2 | Complete |
| 1002 | 1002-3 | Complete |

| Source Batch | Status |
|---|---|
| 1001 | In Progress |
| 1002 | Complete |

METHOD AND PROCESS FOR TRACKING DOCUMENTS BY MONITORING EACH DOCUMENT'S ELECTRONIC PROCESSING STATUS AND PHYSICAL LOCATION

FIELD OF THE INVENTION

The present invention relates to a method and apparatus for tracking the processing status and location of documents. Specifically, the present invention relates to a method and apparatus that operates to correlate the electronic processing status of scanned documents with the physical location of the documents.

BACKGROUND OF THE INVENTION

The Check Clearing for the 21st Century Act (or Check 21) is a federal law allowing a recipient of an original paper check to create an electronic substitute, thereby eliminating the need for further handling of the original check. Check 21 has directly impacted the way companies process incoming payments. Instead of processing paper checks through a multi-step process resulting in a cancelled paper check ultimately being returned back to the customer, companies may now image the paper checks to permit further electronic processing of the check images thereby enabling the original paper checks to be stored or destroyed after imaging. However, in order to ensure that errors are avoided, it is imperative that each check be properly scanned and processed before the paper check is destroyed. As a result, it now becomes desirable to accurately and efficiently track the processing status of check images and the location of the original checks during image processing so that the original checks are not processed improperly or destroyed prematurely.

SUMMARY OF THE INVENTION

In accordance with the present invention a method and system for tracking of documents is provided. In accordance with a particular embodiment of the invention, a system and method for tracking documents includes imaging documents having unique document identifiers to produce electronic images of the documents. Next, the unique document identifiers from the electronic images are read so that the unique document identifiers can be linked to their respective documents and their respective electronic images. The electronic images are processed according to a set of image processes and an electronic status of the image processes associated with the electronic images is provided. The physical locations of the physical documents themselves is monitored by detecting the unique document identifiers of the documents as the documents are moved to selected locations. A physical status associated with the physical location of the documents is provided. The electronic status and physical status is analyzed for compliance with a selected set of conditions. The electronic status and physical status for the documents may be reported as well as whether the electronic status and physical status for the documents are in compliance with the selected set of conditions.

In accordance with another embodiment of the invention, a system and method for tracking documents having unique document identifiers is provided. The documents may be imaged to provide document images of the documents. In accordance with a particular method, document images of the documents are processed. Unique document identifiers are assigned in association with the selected documents and their document images. An electronic processing status for the documents is assigned corresponding to one or more processing steps that operate on the document images. A physical location status for the actual document themselves is also assigned corresponding to a physical location of the documents in response to the detection of the unique document identifiers from the documents at such physical location of the documents. The electronic processing status and the physical location of the documents are then associated and reported to a user.

The present invention also relates to a method for tracking batches of documents as well as groups of batches of documents. For tracking batches of documents, the documents may be imaged to provide document images of the documents. Selected documents are then assigned to a batch of documents and a unique batch identifier is assigned to such batch of documents to distinguish such batch of documents from any other batches. The document images from the batch are processed according to a set of image processes and a processing status is assigned reflective of the state of the image processes for the batch. The unique batch identifier is detected at a physical location of the batch of documents to provide a physical location for such batch of documents. The processing status of such batch is associated with the physical location for the same batch of documents. The associated processing status and physical location of such batch may then be reported to a user.

In order to track batches of documents arranged in a group, the selected batches of documents are assembled into a respective group of batches of documents and a unique group identifier is assigned to each respective group of batches of documents. The unique group identifier associated with a particular group of batches of documents is detected at a physical location to provide a physical location for such group. The processing status of the document images of the documents in the batches in such group are associated with a physical location for such group and the associated processing status and physical location of such group may then be reported to a user.

Various tracking techniques may also be employed. For example, the systems and methods may include establishing processing criteria for the image processes and detecting when a document, for example, in a particular batch, violates the processing criteria. The physical location of the document or the batch of documents containing the document that violates the processing criteria can then be determined. As a consequence, a document violating the criteria can be put back into compliance if possible. Another option includes detecting when a batch of documents has a physical location but not a processing status. The methodology may also include providing conditions of proper correlation between physical locations and processing status and detecting when a batch of documents has a physical location that is not properly correlated with the electronic processing status for such batch. Another technique may include detecting the presence of a batch of documents at a specific location that has not passed through a required electronic process that is a prerequisite to the proper location of the batch of documents at that specific location. The methodology may also detect whether a batch of documents at a physical location is out of sequence along a selected path of movement for such documents. As a consequence, the system may detect when a batch of documents is at a physical location either when or where it should not be located. Detecting non-compliant conditions enables correction of the condition so that compliance can be effected.

The methodology may also enable a batch of documents to be checked out of a specific physical location, for example, for purposes of research or even re-scanning of a particular document. Again in order to detect non-compliant conditions, the methodology may include a step of detecting when a batch of documents is checked out of a physical location for a time period that exceeds a selected time limit for check out. In addition, the system may also detect whether a batch of documents is checked out from a physical location that is not compatible with checkout.

The methodology may also be utilized to determine whether any document in a batch is a reject because the document image for such document fails to meet selected processing criteria. A particular reject may be found at a particular physical location by reading the unique batch identifier for a batch of documents at the physical location of such batch to determine if any documents in such batch have been identified as a reject. The system may also provide the location of the document within the batch, for example, identifying page 15 of the 200 pages in the batch. To facilitate location of the reject, the document image of the reject may be displayed.

The methodology of the present invention also enables the creation of virtual batches or sub-batches of images for purposes of tracking. For example, the methodology may include separating the document images for a batch of documents into selected sub-batches based on a selected processing criteria and then tracking the sub-batches of document images during processing. Optionally, a batch of document may be identified as processed once all of the sub-batches are completely processed. Also, the physical location of the batch of documents may be correlated with the processing of the sub-batches of document images.

The present invention may also enable prep tracking, i.e., the preparation of documents, prior to document imaging. For example, the system may provide for the timing of the preparation of a particular batch of documents. This may be done, for example, to provide an indication of operator efficiency. For example, an operator may scan a barcode on a batch ticket bearing a unique batch identifier before commencing document preparation. Once document preparation has been completed the operator may scan a successive batch ticket to provide the time of document prep between the printing of the successive batch tickets. Alternatively, an operator may simply start a timer at the beginning of document preparation and then print a batch ticket when document preparation has been completed to provide a time period for document preparation of a particular batch. The number of documents in a particular batch may also be calculated to determine the throughput of the operator.

The present invention also includes a system and preferably a computer-implemented system for tracking and performing the methods and methodologies described above.

DETAILED DESCRIPTION OF THE DRAWINGS

The foregoing summary, as well as the following detailed description of the preferred embodiments will best be understood when read in conjunction with the drawings, in which:

FIG. 3 is a representation of an exemplary database view showing more detailed electronic and physical tracking of documents;

FIG. 4 is a representation of an exemplary database view showing the monitoring of documents that have been checked out by a user for research and other purposes;

DETAILED DESCRIPTION OF THE PREFERRED EMBODIMENTS

Figure 1:
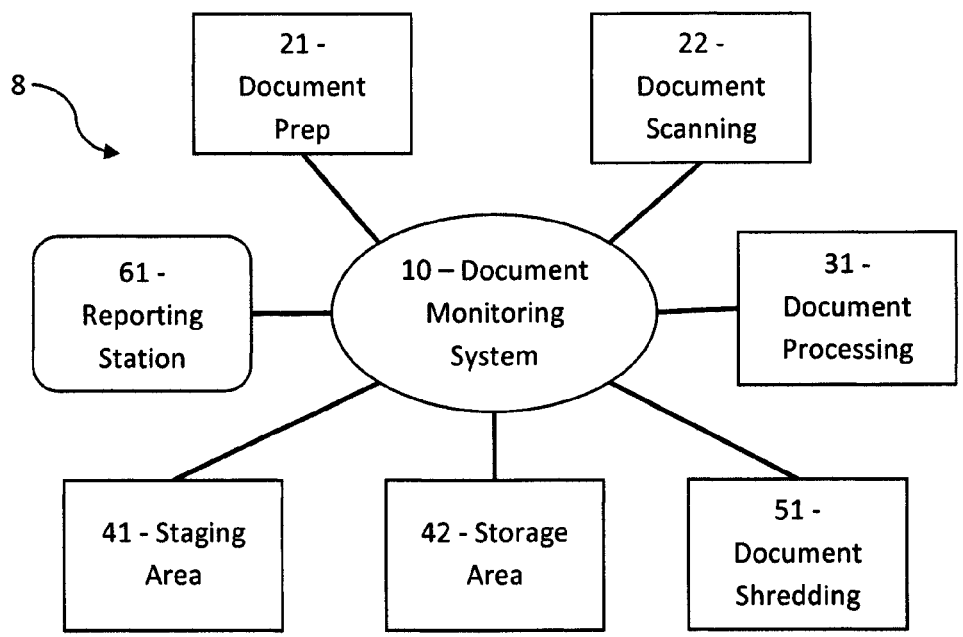
FIG. 1 is a block diagram showing the monitoring system for the tracking of documents in various locations in accordance with the present invention.

Referring to the drawings in general and more specifically to FIG. 1, a system for monitoring documents, generally designated 8, is illustrated. The monitoring system 8 includes a computer-implemented document monitoring system 10 that operates under the control of a computer by tracking documents that are scanned or imaged at a document scanning station 22. Initially, documents to be imaged arrive at a document prep station 21 where the documents are prepared for scanning. For example, the documents may need to be extracted from envelopes or containers, sorted into different categories, stacks, batches, or groups of batches, unstapled and/or detached from one another, or even taped at rips or tears, as well as any other process or procedures needed prior to scanning. The document monitoring system may function to monitor desired activities or processes at the document prep station 21 to provide information such as times and throughput of documents, batches, or groups of batches to yield and report on prep effectiveness such as job prep times and operator efficiency. From the document prep area 21, the documents to be scanned or imaged are sent or conveyed to the document scanning station 22 which includes suitable document scanners or imaging apparatus operatively associated with the document monitoring system 10. Documents are scanned and digital images of such documents are produced at the scanning station 22. The documents are initially imaged. Thereafter, the processing of electronic document images and movement of the documents can be tracked and controlled. The images are transmitted from the scanning station 22 to document processing 31 where information is electronically captured from the document images during one or more processing steps. Some of the processing steps may be automated (do not require operator intervention, i.e., keying) while other steps may be manual (operator keys or makes selections). For example, some automated processes may include:

a. Document Classification—features on the documents are automatically read and used for classification;

b. Binarization—converting a document from color or grayscale to bitonal (black and white);

c. Optical Character Recognition (OCR)—reading machine print on documents;

d. Intelligent Character Recognition (ICR)—reading hand print on documents;

e. Courtesy Amount Read/Legal Amount Read (CAR/LAR)—reading the numerical and written check amount on checks; and f. Image Correction—deskew, rotation, despeckle, etc.

Some examples of manual processes may be:

a. Manual Classification—selecting a document type from a list, in the event auto-classification is not successful;

b. Indexing—manual keying of data from documents; and c. Balancing—manually verifying that the amount on a check matches the amount on a payment coupon.

The document monitoring system 10 automatically monitors the processing steps in document processing 31. Meanwhile, the physical documents themselves that have been scanned at the document scanning station 22 may be transported to another location, such as a staging area 41 where, for example, the documents can be temporarily held or detained until suitable image verification is achieved at document processing 31. For example, if a specific document needs to be rescanned it can be identified and then retrieved from the staging area 41. From the staging area the documents may be moved to a storage area 42 for temporary or permanent storage. If desired, documents can be moved from either the staging area 41 or the storage area 42 to document shredding 51 for shredding or other destruction. The monitoring system may also detect improper movements if movement of the documents from the staging area 41 directly to the shredding area 51 is not permitted in a particular application. The monitoring system 10 tracks such physical movement of the actual documents. Document reporting station 61 is operatively associated with the document monitoring system 10 to enable an operator to monitor information about the documents and the document images.

Figure 2:
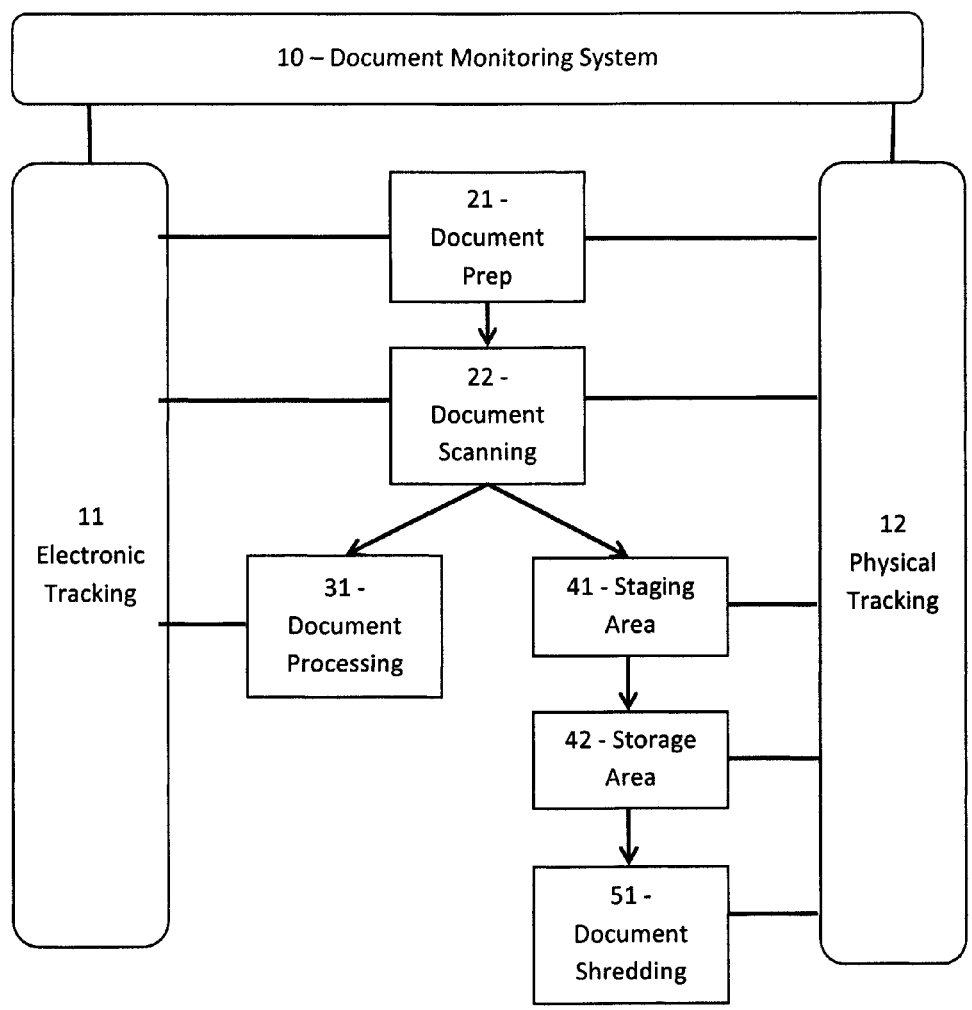
FIG. 2 is a block diagram showing the electronic and physical tracking of documents within the monitoring system shown in FIG. 1.

Referring to FIG. 2, a general overview of the monitoring system and method is provided. The document monitoring system 10 includes computer-implemented electronic tracking 11 for monitoring the electronic flow of document images from document scanning 22 through document processing 31. Electronic tracking 11 monitors the status of document imaging processes at document processing 31, as selected or desired set of processes operate on the document images. Again, for example, document imaging processes may include an automated document classification process for recognizing form types or optical character recognition (OCR) for reading printed information from certain forms or documents.

For optimal system performance, it may be desirable for electronic tracking 11 to also track the progress of document images as they flow through document processing 31. More specifically, it may be desirable to monitor the processing rates for each of the processes operating on the document images. For example, should a backlog of images occur at a process, due to increased document volume or degradation or complete failure of the process, it may be desirable that an alert be issued to the reporting station 61, notifying an operator of an impending problem.

It may also be desirable for electronic tracking 11 to monitor that document images properly flow to and are effectively processed by all the processes in document processing 31 that are scheduled for each specific document type. In particular, some document types, such as checks, may be reliably recognized by the document scanner and can bypass document classification, while other documents, such as complicated medical forms, require a more sophisticated classification process for reliable recognition. Electronic tracking 11 monitors the flow and processing of documents to ensure that each document image is correctly routed by document processing 31 to the appropriate image processes and in the proper sequence. Should a process fail or an out-of-sequence condition be detected, the monitoring system 10 communicates to the reporting station 61, which alerts an operator by displaying a warning message. Alternatively, the reporting station 61 can send a real-time message to an individual or group of individuals via email or text messaging.

In addition to tracking the electronic flow of document images through the various processes within document processing 31, electronic tracking 11 monitors the performance of each process and reports the results to an operator via the reporting station 61. For example, electronic tracking 11 reports the recognition rate of the classification process used to determine document types and/or the read rate of the OCR process used for character and word detection. Furthermore, should any rates fall outside a normal or selected operating range, an alert is issued and communicated to the reporting station 61.

Again, beyond the automated processes, such as classification and OCR, document processing 31 may include manual processes such as operator input of data, e.g., keying of data, commonly referred to as data entry or indexing. Similar to automated processes, tracking of manual data input may be desirable to ensure a document imaging operation achieves optimal throughput and high quality levels. Accordingly, electronic tracking 11 accumulates and reports a variety of operator input metrics such as keying rates, document processing rates, and error rates.

Referring again to FIGS. 1 and 2, the monitoring system 8 includes physical tracking 12 operatively associated with the document monitoring system 10 that operates to monitor the physical movement of the actual documents themselves instead of the document images. Tracking of a document's physical location typically starts at document scanning 22. Physical documents are initially prepared for monitoring at the document prep area 21 and then supplied to document scanning 22. When a document passes through a document scanner at document scanning 22, the document is imaged to create an electronic image of the document, and a particular unique identifier is associated with each document, for example, by attaching or printing the unique identifiers on the document. The unique identifier associated with a physical document is then automatically read and electronically tagged to the captured electronic image of the document thereby operatively associating the unique identifier with both the physical document and the captured image of the document. The unique identifier may preferably be a printed one-dimensional (1D) barcode, such as a 3 of 9 barcode or a code 128 barcode, which contains enough digits to uniquely distinguish one document from all other documents. The monitoring system 10 monitors the document scanner output for newly-captured images and associated unique identifiers and, upon detecting such images and identifiers, registers the unique document in a computer database for the monitoring system 10. Additionally, the monitoring system 10 updates the electronic status and current location for the unique document. At this point of initial scanning, the electronic status of the document image is updated with a "ready-to-process" status, while the current location of the physical document is updated with an "at-scanner" location. Thereafter, electronic tracking 11 continues to update the electronic status of the document image and physical tracking 12 continues to update the physical location status of the actual document. As physical documents are transported to a new location, such as from document processing 31 to staging area 41, operators utilize a handheld barcode scanner 87 to read or check-in documents at the new area. Other check-in methods may be utilized such as an RFID tag for automated check-in. The barcode scanner preferably has an ability to read 1D barcodes and is connected to a computer 91 via a wired or wireless connection as shown in FIG. 5D. A client software application 92, running on the computer 91, communicates the unique document identifiers to physical tracking 12, which, in turn, communicates the information to the monitoring system 10. The physical tracking process is repeated as documents are moved from one physical location to the next, such as from the staging area 41 to storage area 42 where documents may be temporarily or more permanently stored or to document shredding 51 where the documents may be shredded or otherwise destroyed. The exact location of each document is always known and so, at any time, an operator can query the monitoring system 10 using the reporting station to find a location of a particular physical document.

Although the foregoing description details the tracking and monitoring of documents at a single page level, the same apparatus and method disclosed can be utilized to track a batch of documents. For this purpose, a unique batch identifier may be associated with a batch of documents. For example, the unique batch identifier may be associated with the first document in a batch or may be associated with a separate document, called a batch ticket, that can be added as the first page of the batch. Thereafter, the monitoring system 10 tracks batches of documents. More specifically, as an assembled batch of documents is imaged at document scanning 22, the scanner reads the unique batch identifier, for example a barcode, from the first page which again may either be associated with the first page of the document in the batch or with a separate batch ticket being used as the first page of the batch. The unique batch identifier is communicated to the monitoring system 10 for storage into a database. As the batch is processed through document processing 31, the electronic batch status is updated by electronic tracking 11, as needed. Concurrently, as the batch of documents is physically moved from location to location, the unique batch identifier is detected, for example, as scanned by operators utilizing a barcode scanner or through automated detection, and the physical batch location is accordingly updated in the database by physical tracking 12.

Referring now to FIG. 3, the simultaneous tracking and correlation of electronic status and physical location of documents or batches of documents is illustrated. FIG. 3 is a representation of a partial database view showing a partial listing of unique batch identifiers, numbered 101 to 115, corresponding to batches of documents, along with selected status information for each batch. For example, the database view shows that batch ID 115 was scanned approximately one minute ago and the batch is physically located at the scanner. The batch is ready to be electronically processed, but has not yet been picked up by the first processing step, hence the electronic status is empty. Since this may, for example, be a valid combination of states, the overall status for the batch is marked as OK.

The next two entries in the database view are for Batch IDs 114 and 113, which were scanned five and ten minutes ago, respectively, and are also physically located at the scanner. Unlike Batch 115 however, electronic processing of these batches has commenced—Batch ID 114 is being processed by Process 1 and Batch ID 113 is being processed by Process 3. Both batches are in valid states and are therefore marked with an OK status.

In contrast, Batch ID 112 is in an error state. This batch was scanned twenty minutes ago but has not yet been picked up by an electronic process. The monitoring system 10 may be configured to require that processing of a scanned batch start within selected time period, for example, 10 minutes. Since the ten minute period is exceeded, an error is reported to the reporting station 61. The delay in processing the batch may be a result of one of several causes, for example, the batch import process may have failed or the image and data output from the scanner may be in a corrupted state. Regardless, the monitoring system 10 was able to detect the error condition and alert an operator to research the cause. As such, Batch ID 112 is no longer at risk of not being processed and the possibility of subsequent batches being delayed for the same cause is minimized.

Entries in the database view for Batch IDs 111 and 110 illustrate how the physical location of documents and batches are tracked. In both cases, the batches have been checked-in, for example, by an operator using a handheld barcode scanner at the staging area 41. In the case of Batch ID 111, the electronic status (batch being processed by Process 5), previous physical location (scanner), and current physical location (staging) is valid. The sequence of physically moving a batch from the scanner to the storage area while document processing 31 operates on the batch may be a proper configuration rule within the monitoring system 10 and, in fact, the movement of Batch ID 111 is in compliance with the rule. In comparison, Batch ID 110 was first detected at the staging area. Batch ID 110 has not gone through the scanning stage as the previous location entry is empty, as is the time (elapsed from scan time) value. Since a batch's first detection at the staging area 42 is an invalid condition, based on the monitoring system's rules, an error is issued. Physical tracking, in conjunction with electronic monitoring, is especially important in this example, as the likely causes for such error include an operator mistakenly moving a batch of documents past the scanning process, a scanner failing to correctly process a batch, or the scanner image and data output being diverted to an incorrect location. Whatever the cause, the monitoring system 10 prevents the disastrous consequence of a batch not being processed, which is particularly critical in a one-pass Check 21 payment environment. In earlier implementations of automated check processing, where documents are initially passed through an imaging step and checks are then passed a second time for encoding, an error as described would typically be caught when re-running the checks since the batch would not be recognized. However, with Check 21, check images are sent directly to the bank. There is no second pass encoding and hence no safety net. As set forth above, the monitoring system 10 allows for reliable, automated processing in a Check 21 environment, in essence returning the much-needed safety net for detecting operating errors.

Continuing with the description of the monitoring system 10 and still referring to FIG. 3, Batch IDs 109 to 105 illustrate various additional stages of processing. Batch ID 109 shows that electronic processing is complete and the batch is located in the staging area 41, one hour after being scanned, a legal state. Likewise, Batch ID 108 is in a valid state: electronic processing is complete and the batch has been moved from the staging area 41 to the storage area 42. In contrast, Batch ID 107 is in an error state. Electronic processing is in progress and by rule the physical batch may not be permitted to leave the staging area 41. Accordingly, as soon as an attempt is made to check-in Batch 107 into the storage area 42, an alert is issued by the monitoring system 10, notifying the operator to return the batch to the staging area 41. The database view shows that Batch IDs 106 and 105 are in a normal state— electronic processing is complete and the batches are physically located in the storage area, as permitted.

After documents are warehoused or stored in the storage area 42 for a selected period of time, such period being configurable in the monitoring system 10, the documents are typically scheduled for destruction, usually by shredding. The proper destruction of documents is particularly important in a Check 21 environment. While retaining checks for a reasonable period of time, usually between 15 and 30 days, is needed for research purposes, keeping checks around too long exposes the processor to unnecessary risk, as checks could be deposited a second time. Alternatively, shredding checks too early may have a detrimental impact in cases when research requires pulling the original document. And, mistakenly shredding checks that have not been processed is a serious issue. All of these issues are avoided with the timely shredding of documents controlled by the monitoring system 10.

Again, referring to FIG. 3, the database view illustrates how the shredding process is controlled. By rule, batches must be retained for a selected period of time before shredding, for example, 15 days. Should an operator attempt to check-in a batch at the shredding station that has not aged for the required period, an error alert is issued. Batch ID 104 illustrates this condition. The batch is only 14 days old and an attempt is being made to shred the batch. As the operator scans the batch with a handheld barcode scanner, for example, the monitoring system 10 immediately issues an alert notifying the operator not to drop the batch into the shredder. In contrast, an operator scanning batch 103, which is aged for 16 days, is provided a go-ahead message indicating it is safe to destroy the batch. Two additional error conditions are illustrated in FIG. 3. Batch ID 102 shows an error message resulting from an optionally illegal move sequence—the batch is being moved from the staging area 41 directly to document shredding 51, without passing through the storage area 41. Batch ID 101 has been retained beyond the upper bound of the selected retention period of 20 days, and, accordingly, an alert is issued prompting the operator to immediately shred the batch.

The above-described rules are a mere exemplary subset of possible configuration options and conditions for compliance within the monitoring system 10. The combination, and correlation, of electronic monitoring and physical tracking, along with selected time constraints allows customization of the monitoring system 10 for a wide range of document processing applications. For example, the monitoring system 10 can be extended to monitor temporary check-outs of documents or batches of documents for various reasons. For example, a utility company implementing the monitoring system 10 may be processing check payments but during document processing 31 it may discover that one of the imaged checks is not readable. In response, the operator may elect to retrieve the original check and examine it more closely. The inherent danger of simply pulling a single document or an entire batch of documents from a holding area, such as staging area 41, is that the operator will forget to return the document or batch to its proper location. This risk is alleviated by the monitoring system 10 by implementing a controlled check-out process. Whenever an operator needs to pull a document or a batch for research or some other purpose, the operator is able to initially determine the exact current location of the batch, for example, by inputting the corresponding unique Batch ID at a reporting station 61. In response, the physical location, for instance the staging area 41, will be displayed as that batch's current location. The operator then proceeds to the staging area 41, locates the batch, and checks the batch out. The check-out process may be accomplished, as illustrated in FIG. 5D by scanning the attached unique Batch ID with a handheld barcode scanner 87 connected to a computer 91, which is running a client software application 92 that transmits the unique batch ID to the monitoring system 10. The computer 91 can be located in one or multiple convenient areas, such as the staging area 41 and storage area 42. When checking out the batch, the operator typically logs into the client application 92, inputting a user name. Optionally, the operator can also input a note detailing the reason for checking out the batch.

Referring to FIG. 4, a partial database view showing the check-out process is illustrated. As can be seen, Batch IDs 204 and 202 have not been checked out, however, Batch ID 203 has been checked out by User Nadine two hours ago to research an amount on one of the documents. According to the rules setup in the monitoring system 10, the check-out is in a valid state. In comparison, Batch ID 200 is in an error state because User Laura checked out the batch to perform a customer inquiry 25 hours ago, exceeding maximum check-out period, for example, 24 hours, configured within the monitoring system 10. In addition to updating the database view, the monitoring system issues an alert to the reporting station 61 so that corrective measures can be initiated by a supervisor monitoring system status. Once the offending batch is checked back in, the error is automatically cleared, although an error entry is made in a system log for future reference. The database view in FIG. 4 also shows that another User Danielle attempted to check out a batch having Batch ID 201, directly from the scanner location, an action specifically restricted by the monitoring system 10. Accordingly, an error status is recorded for this action. This check-out procedure may also be used for individual documents using the unique document identifier associated with each document. If batches of documents are combined into a larger group of batches of documents and a unique group identifier is assigned or associated with each group, the check-out procedure can also be used to monitor the check-out of groups of batches of documents so that check-out of individual documents, batches, or groups can be monitored.

Figure 5A:
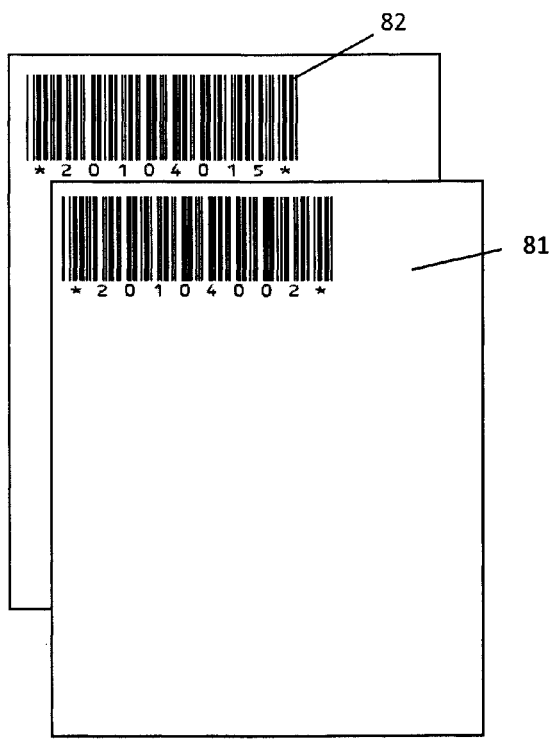
FIG. 5A is a schematic diagram showing documents, each having a unique identifier such as a barcode.
Figure 5B:
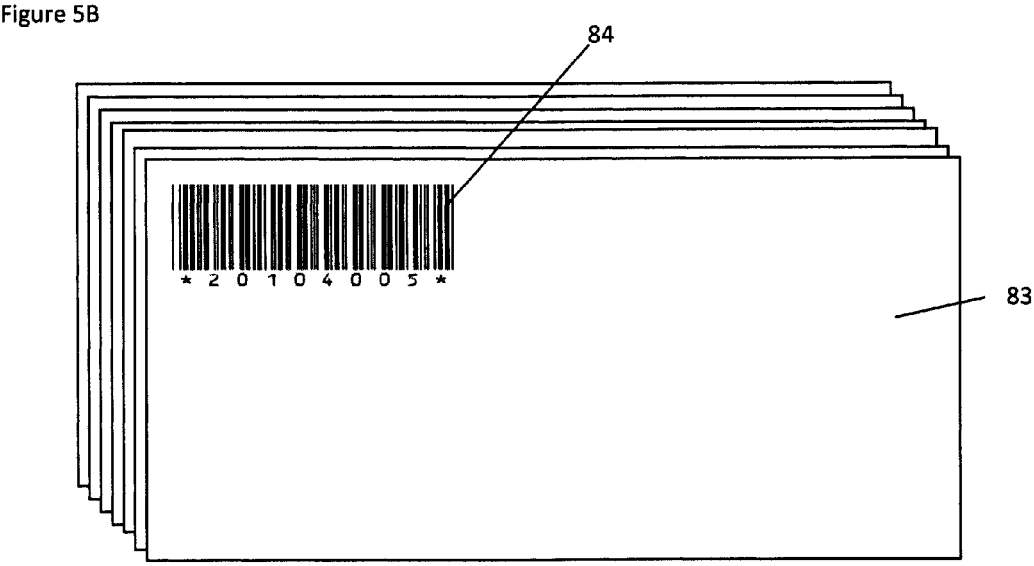
FIG. 5B is a schematic diagram showing a batch of documents with the first document having a unique identifier such as a barcode to identify the batch of documents.
Figure 5C:
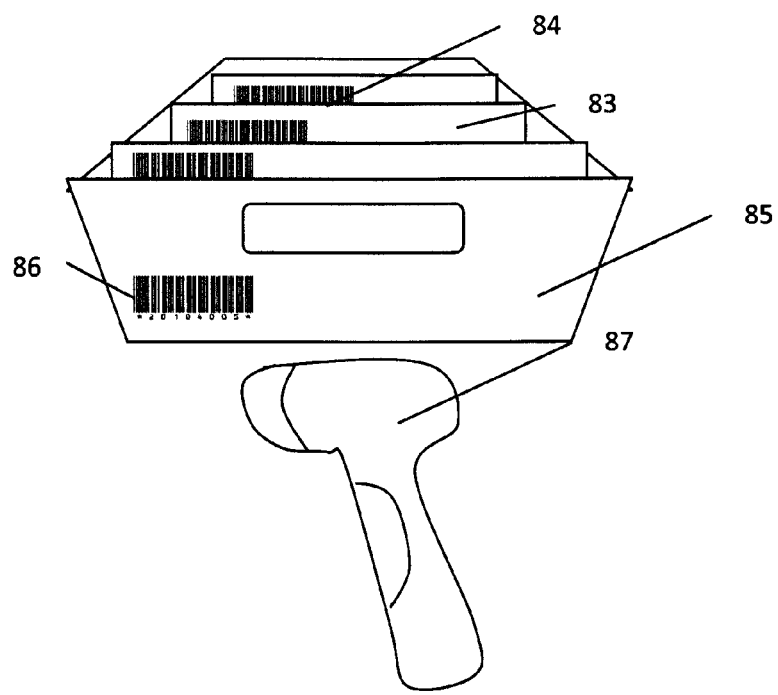
FIG. 5C is a schematic diagram showing a scanner and a group of batches of documents in the form, for example, of a mail tray holding the batches of documents with a unique identifier, such as a barcode, assigned to the mail tray or the group of batches of documents.
Figure 5D:
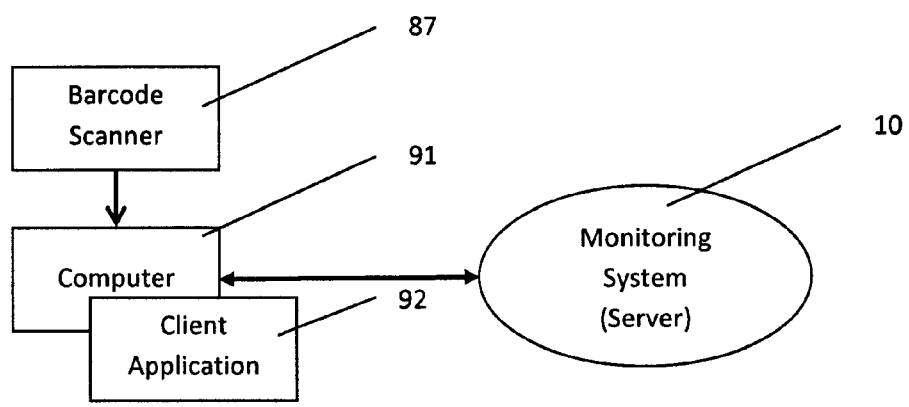
FIG. 5D is a block diagram showing a client system including a computer-implemented client application running on a client computer associated with a barcode scanner and connected to a server for the monitoring system.

Described so far is a method and apparatus for tracking individual documents as shown in FIG. 5A where each individual document 81 includes a unique barcode identifier 82 that distinguishes each specific document from all other documents. Similarly described is the tracking of batches of documents as shown in FIG. 5B where a stack or batch of documents 83 includes, for example, a first page, commonly referred to as a batch ticket, which includes a unique batch identifier 84 that distinguishes each batch from all other batches. As the individual documents or batches of documents move from one location to another, the barcoded documents and batches are scanned and the corresponding physical locations are updated in the monitoring system database. Now referring to FIG. 5C, the tracking of groups of documents or groups of batches of documents is illustrated. Shown is a mail tray 85, for example, holding multiple batches of documents 83 or in effect a group of batches of documents. A unique tray barcode 86, attached to the tray, distinguishes the tray from all other trays and also distinguishes the tray from any batches of documents or individual documents with unique barcodes of their own. As such, the tray barcode functions as a unique group identifier. Also shown is a schematic view of a handheld barcode scanner 87, such as Model LS 4278, manufactured by Symbol Technologies. Initially, an operator loads multiple batches 83 into a tray 85 so that the unique barcode batch identifiers 84 are oriented upward and facing frontward as shown in FIG. 5C. Thereafter, the operator selects a tray-create option in a client software application 92 running on the same computer 91 that is connected or otherwise associated with the barcode scanner 87 as shown in FIG. 5D. Upon reading the tray barcode 86, the client software application transmits a message to the monitoring system 10, requesting the system to start tracking a new tray. If the corresponding tray barcode identifier has not yet been used, the request is accepted and the operator is prompted to scan the batch barcodes 84 for all the batches 83 located in the mail tray 85. Each batch barcode identifier is transmitted to the monitoring system 10 and recorded in a database, which creates a link between the tray and every batch in the tray. Likewise, each document in each batch has been linked to its respective batch when the individual batches were created. After all batches in the tray are checked-in, the operator selects an option in the client software application 92 indicating that the tray check-in process is completed. Thereafter, an entire tray of batches can be moved from one location to another with an operator only needing to check-in the tray by scanning the tray barcode 86. When the tray barcode 86 is scanned and the unique tray identifier is transmitted to the monitoring system 10, the monitoring system, in turn, searches through a batch table and updates the physical location for each batch linked to the scanned tray identifier. Accordingly, a tray of fifteen or more batches, for example, may be efficiently moved and tracked.

Figure 6:
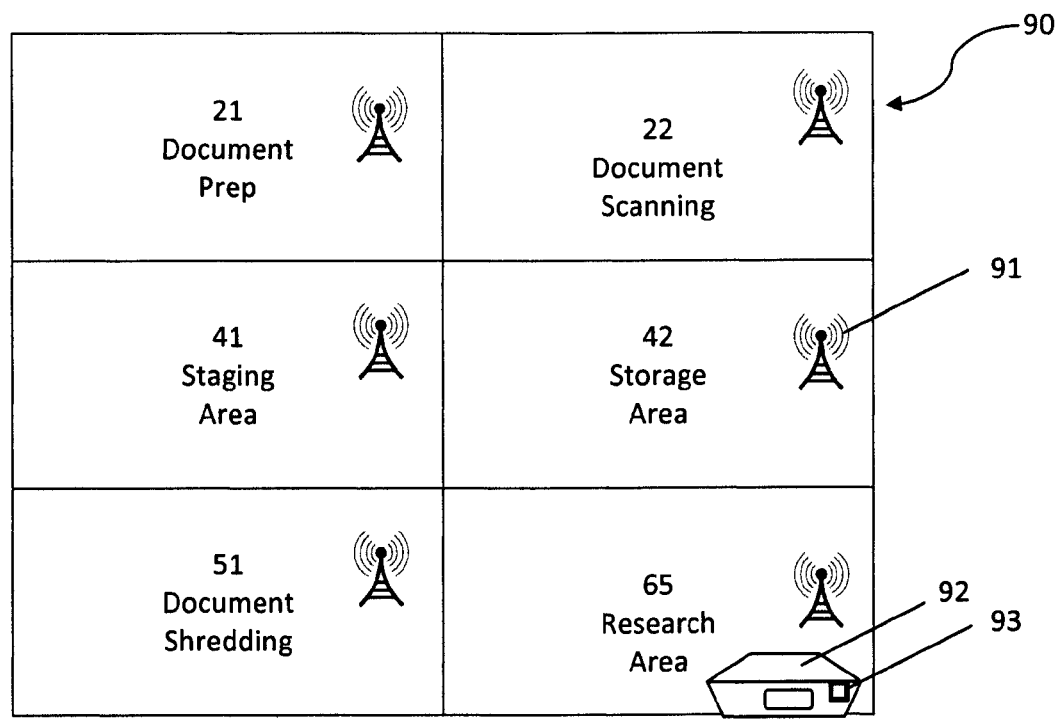
FIG. 6 is a schematic block diagram illustrating the physical tracking of documents utilizing radio frequency identification (RFID)

As described previously, tracking documents, batches, and trays using unique barcodes is one of the preferred methods of monitoring the locations of items. Alternatively, as illustrated in FIG. 6, radio frequency identification (RFID) can likewise be used to effectively track items at the document, batch, and/or group level as desired. The RFID tracking may also be combined with barcode tracking. For example, barcodes can optionally be used to track documents or perhaps batches, while RFID tracking is used to track groups or trays, or perhaps even batches that are not barcoded. One of the advantages of RFID tracking is its automated method of scanning and monitoring movement, rather than the manual barcode tracking method. Moves are automatically detected without requiring an operator to manually scan each document, batch or tray. Shown is a schematic view of an RFID system 90. The various areas of a processing operation are sectioned off, preferably in a grid-like configuration. For example, the document prep area 21 area is located in one of the grids, and the document scanning area 22 and staging area are 41 are located in adjacent grids. Also shown, are multiple readers or interrogators 91, one per grid, although other configurations are possible. The readers 91 may be centrally or otherwise located within an area, however preferably proximate to the holding area for documents. A representative tray of mail 92 is shown in FIG. 6 with and RFID tag 93 attached. As trays 92 are moved from one area to another, RFID readers 91 detect the presence and absence of trays. Similar to barcode tracking, physical movement of trays are tracked, with configuration rules within the monitoring system 10 dictating which of the moves are valid. Any illegal move is immediately reported to the reporting station 61 so that corrective action can be taken.

Another implementation of the monitoring system 10 is for tracking document prep 21, as shown in FIGS. 1 and 2. Document prep operations frequently involve the preparation of documents into neat stacks or batches prior to scanning. Initially documents may be automatically or manually extracted from envelopes, pulled from file folders, or otherwise gathered from various sources. The document prep process 21 is time consuming, as documents need to be unfolded, staples removed, torn pieces taped back together, and pages ordered, among other preparation activities. Due to the amount of labor required to prep documents, the risk of processing errors is quite high. Poor prepping can reduce the throughput on document scanners and reduce the quality of document images. Furthermore, it is possible to lose track of batches and either mistakenly not scan the batches at all or unnecessarily delay batches that have the highest priority, resulting in missed deadlines and potentially costing the processor to pay penalties. To alleviate these concerns, the monitoring system 10 provides a method for tracking documents and monitoring operator efficiency.

Figure 7:
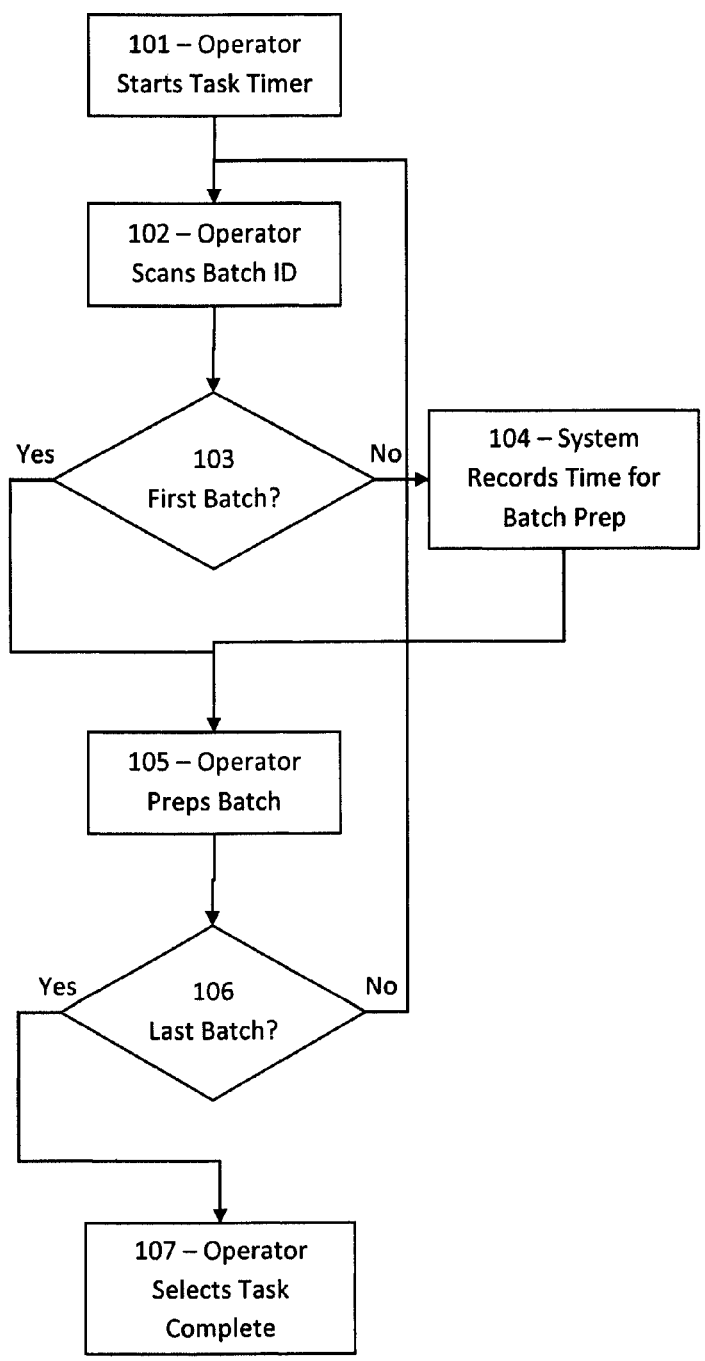
FIG. 7 is a flow chart showing the tracking of documents through a batch preparation process prior to imaging the documents.

Referring to FIG. 7, a flow chart is shown, illustrating a desired computer-implemented method for document prep monitoring. An operator logs into a client application 92 running on a computer 91 proximate the prep station and starts a task timer or causes a task timer to start at step 101. As soon as the selection is made, the client application 92 communicates with the monitoring system 10 to register the prepping task, at which time the monitoring system starts a timer to begin to measure the prep period. Next, at step 102, the operator pulls a batch header sheet containing a unique batch barcode from a pile of pre-printed batch headers and scans the barcode into the client application 92 utilizing a mounted handheld barcode scanner 87. In turn, the client application communicates the batch identifier to the monitoring system 10 and the unique batch identifier is recorded in a database. If the batch is the first batch at step 103, the operator then proceeds to prep the batch of documents at step 105. After the batch is prepped, if the batch is not the last batch to be prepared at step 106, the operator returns to step 102 and scans another header sheet with a unique barcode. At this stage, the system determines at step 103 that such next batch is not the first batch and automatically records the time spent prepping the just-completed batch at step 104. Meanwhile, the operator starts prepping the next batch at step 105. The described process continues until the operator completes the batch prepping task for the last batch, at which point, the operator selects the task complete option in the client application 92 at step 107. Finally, the client application communicates to the monitoring system 10 that the task is completed and the monitoring system records the time spent prepping the last batch. As a result, all of the prepped batches are recorded in the monitoring system's database, along with the time required to prep each of the batches. The monitoring system also provides the cumulative amount of time needed by the operator to prep the group of batches.

Figure 8:
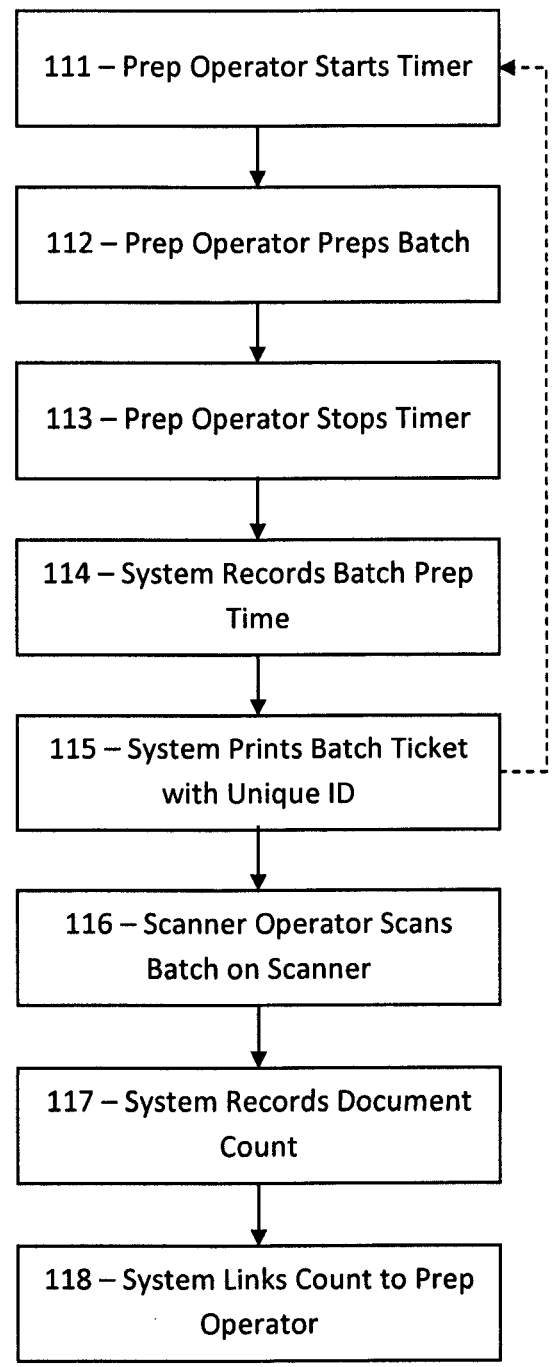
FIG. 8 is a flow chart showing an alternate method of tracking documents through a batch preparation process prior to imaging the documents.

Referring to FIG. 8, illustrated is an alternative method for tracking the batch prep process. Starting at step 111, an operator starts a task timer or causes a task timer to start, similar to the method shown in FIG. 7. The operator then starts prepping the batch of documents in step 112. As soon as the batch prep is completed, the user stops the batch timer, in step 113, by selecting the corresponding option on the client application 92, which communicates the selection to the monitoring system. Upon receiving the message, the monitoring system 10 automatically records the batch prep time into a database at step 114. Additionally, the monitoring system 10 creates a unique batch identifier and communicates the identifier back to the client application 92. Upon receiving the unique identifier, the client application prints a batch ticket with the unique identifier at step 115. Typically, the operator resumes batch prepping at step 111 for any additional batches as shown by the dotted line and continues prepping batches, as required.

Regardless which prep process is utilized—either the one shown in FIG. 7 or the one shown in FIG. 8—the prepped batches are transported to a document scanner at step 116. A scanner operator, having logged onto the scanner station utilizing a user id, then proceeds to scan the prepped batches at step 116 in FIG. 8. The document scanner images all the documents in a batch and also reads the unique barcode on the header page. Concurrently, the monitoring system 10 monitors the output produced by the scanner and automatically records the unique batch identifier for the batch along with the number of document pages into a database, at step 117. Lastly, at step 118, the monitoring system links the unique batch identifier read during the scanning process with the unique document identifier read or printed during the document prep process. Consequently, the number of pages scanned can be credited to the prep operator. Since the prep time for every batch is also linked, the processing throughput for each operator can be calculated and delivered to the reporting station 61. In turn, supervisors can monitor and compare operator performance. Furthermore, since the scanned batches are tagged with the user id of the scanner operator and also linked to the user id of the operator prepping the batches, quality of processing can be attributed to specific operators.

The monitoring system 10 is also configurable to assist operators, through a computer-executed process, to pull exception documents that are rejected during document processing 31. Exception documents are in essence reject documents because of a failure to meet one or more selected processing conditions. On occasion, a particular document or group of documents cannot be processed after they are scanned. One type of exception results when a lightly printed document is scanned by a document scanner producing an unreadable image. A second type of exception is the inadvertent scanning of a document that should have been excluded from the batch—perhaps a check received by a utility company was written out to pay for a customer's cable bill. A third type of exception results when documents are scanned out of sequence, possibly due to a prepping error. While not an exclusive list, the described exception types provide a sampling of reasons that document images may be rejected during document processing 31.

Figure 9:
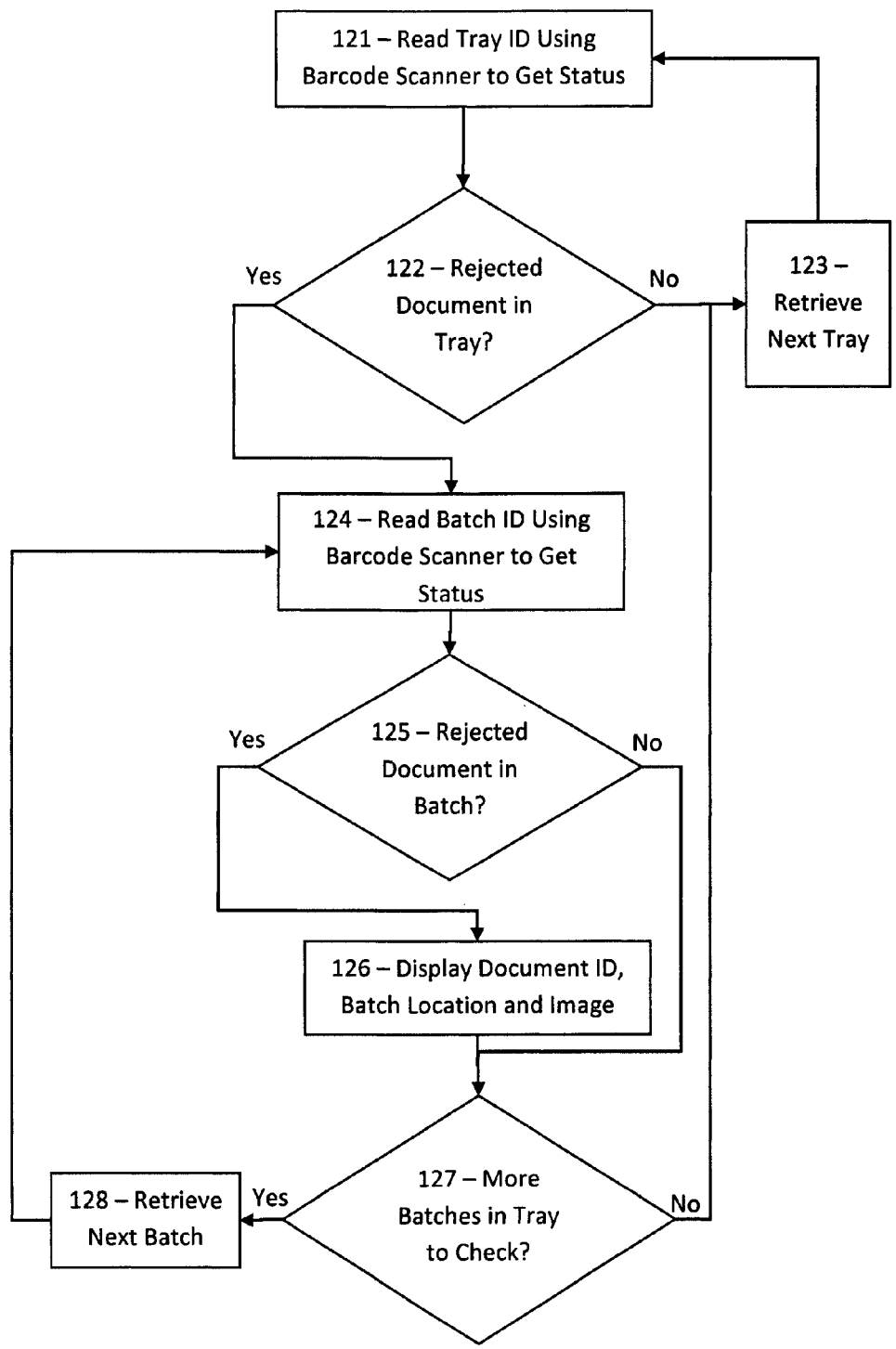
FIG. 9 is a flow chart illustrating a method of monitoring pulled documents rejected during image processing.

The optimized pulling of exceptions takes advantage of the tray tag identification method described earlier, whereby batches of documents are loaded into mail trays and the batch identifiers attached to each batch are linked with a unique tray identifier affixed to the mail tray. As illustrated in FIG. 9, at step 121, an operator may utilize a handheld barcode scanner to read the unique barcode on a tray, or alternatively an RFID scanner may be used to automatically read the RFID tag on a tray. The barcode scanner communicates with a client application 92 running on a local computer 91, which, in turn, sends a message to the monitoring system 10. If there are no rejected exception items, the monitoring system sends a message, which is displayed in the client application 92, prompting the operator, at step 123, to retrieve the next tray of batches. Alternatively, if there is a reject that needs to be pulled, the operator is prompted to respectively scan the barcode identifiers on each batch in the tray at step 124 utilizing a barcode scanner. The barcode scanner communicates with the client application 92, which sends a message containing the batch identifier to the monitoring system 10. If there are no rejected exception items in a batch, the monitoring system sends a message, which displays in the client application, prompting the operator, at step 128, to retrieve the next batch. Conversely, if there is a rejected document in the batch, the client application 92, at step 126, displays the document identifier corresponding to the document that needs to be pulled. Typically the document identifier is also printed on the rejected document during the scanning process, and so, the operator is required to match the document identifier displayed on the client application with the corresponding number physically printed on the document. Additionally, the client application can be configured to provide the location within the batch for the document to be pulled to further assist the operator. For example, if the client application displays that there are 200 documents in the batch and the document to be pulled is document 50, the operator knows to start looking for the target document approximately 25% of the way from the top of the batch. Furthermore, the client application can further facilitate the reject pulling process by displaying an image of the item to be pulled. Accordingly, the operator can efficiently locate the document, further assuring that the correct document is pulled by matching the document with the displayed image.

Figures 10A, 10B, 10C:
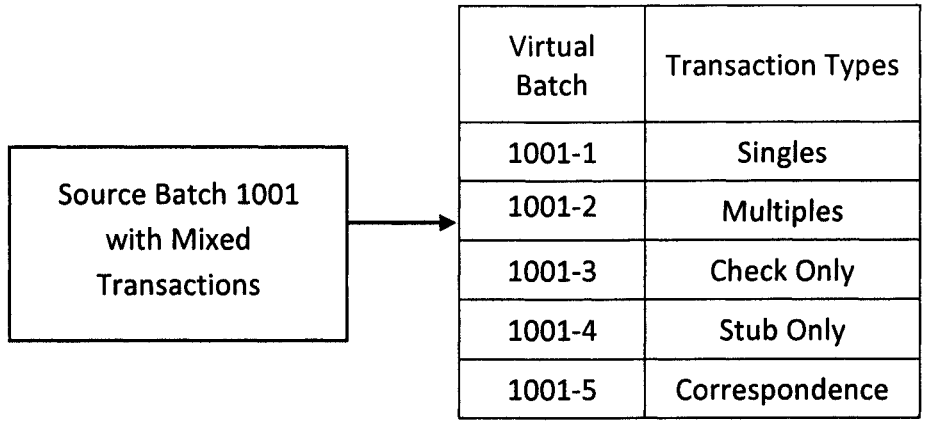
FIG. 10A is a representation of a partial exemplary database view showing how a source batch of mixed transactions is mapped to multiple virtual or sub-batches or categories of documents.
FIG. 10B is a representation of a partial exemplary database view showing the tracking status of virtual or sub-batches or categories of documents.
FIG. 10C is a representation of a partial exemplary database view showing the tracking status of source batches.

Referring now to FIGS. 10A-10C, a computer-executed method for efficiently improving document processing 31 by dividing source batches, imaged during document scanning 22, into sub-batches or virtual batches is illustrated. Specifically, referring to FIG. 10A, shown is a source batch 1001 containing mixed transactions. The source batch 1001 may, for example, contain a mixture of different categories of transactions such as, for example, singles transactions (consisting of one check and one payment coupon), multiples transactions (consisting of at least one or more checks and one or more payment coupons), check only transactions (consisting of checks and nothing else), stub only transactions (consisting of stubs and nothing else), and correspondence transactions (consisting of various notes and information documents from a customer). The above categories of transactions are exemplary. Accordingly, other transaction combinations are possible and are not specifically excluded. As shown in FIG. 10A, the source batch 1001 is electronically split by document processing 31 into five virtual batches, numbered 1001-1 to 1001-5, each of the virtual batches corresponding to a specific transaction type or category. After the split, each virtual batch is treated as if it had been physically sorted into its own sub-batch and imaged on the document scanner. Referring now to FIG. 10B, shown is a partial database view used by the monitoring system 10 to track the status of each virtual batch. For example, virtual batch 1001-1 (a singles batch) is in Process 3, while virtual batch 1001-2 (a multiples batch) is in Process 4. The remaining virtual batches 1001-3 to 1001-5 have completed electronic processing. Nevertheless, since there are two pending virtual batches, 1001-1 and 1001-2, for source batch 1001, the source batch status, as shown in FIG. 10C remains in an "In Progress" state. By contrast, all the virtual batches corresponding to source batch 1002 have been electronically processed, and so the source batch status for batch 1002 is marked "Complete." The described electronic tracking of virtual batches allows the monitoring system 10 to correlate electronic processing of source batches with the physical movement of source batches, exactly as described earlier. All the same rules within the monitoring system 10 can be utilized and physical batch movements can be controlled, irrespective of the fact that the source batches are internally split into subsets or virtual batches for efficient processing.

It will be recognized by those skilled in the art that changes or modifications may be made without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method for tracking batches of documents, comprising the steps of:
    a. imaging documents to provide document images of the documents;
    b. assigning selected documents to a batch of documents;
    c. assigning a unique batch identifier to the batch of documents to distinguish a batch of documents from any other batches;
    d. processing the document images from the batch according to a set of image processes;
    e. assigning a processing status reflective of a state of the image processes for the batch;
    f. detecting the unique batch identifier at a physical location of the batch of documents to provide a physical location for such batch;
    g. associating the processing status of such batch with the physical location for the same batch;
    h. reporting the associated processing status and physical location of such batch;
    i. preventing further processing of the batch of documents and the document images from the batch when at least one of the processing status and physical location of such batch is not in compliance with a selected set of conditions; and
    j. detecting whether a batch of documents is checked out of a physical location for a time period that exceeds a selected time limit for check out.

2. The method of claim 1 including the steps of:
    a. assembling selected batches of documents into a respective group of batches of documents;
    b. assigning a unique group identifier to each respective group of batches of documents;
    c. detecting the unique group identifier associated with a particular group of batches of documents at a selected physical location to provide a physical location for such group;
    d. associating the processing status of the document images of the documents in the batches in such group with a physical location for such group; and
    e. reporting the associated processing status and physical location of such group.

3. The method of claim 2, comprising the steps of:
    a. identifying any document as a reject when the document image for such document fails to meet selected processing criteria and determining whether any document in a batch is a reject; and
    b. identifying a group that contains a reject.

4. The method of claim 2 wherein the step of associating the processing status of the document images of the documents in the batches in the group with a physical location for such group includes assigning a processing status to the group reflective of the processing status of the batches in the group.

5. The method of claim 3, comprising the step of identifying whether a particular batch from a selected group of batches has the reject.

6. The method of claim 5, comprising the step of scanning each batch of documents within a group to determine which batch in the group contains the reject.

7. The method of claim 1 including the steps of:
    a. establishing processing criteria for the image processes;
    b. detecting when a document in a batch violates the processing criteria; and
    c. determining the physical location of the batch of documents containing the document that violates the processing criteria.

8. The method of claim 1 comprising the step of detecting when a batch of documents has a physical location but not a processing status.

9. The method of claim 1 comprising the steps of providing conditions of proper correlation between physical locations and the processing status, and detecting when a batch of documents has a physical location that is not properly correlated with the electronic processing status for such batch.

10. The method of claim 1 comprising the step of detecting the presence of a batch of documents at a specific location when the document images for such documents have not passed through a required image process that is a prerequisite to the location of the batch of documents at that specific location.

11. The method of claim 1 comprising the steps of providing a path of movement of the batch along a set of the physical locations and detecting whether a batch of documents at a physical location is out of sequence along the selected path of physical locations.

12. The method of claim 1 comprising the steps of providing time periods for the batch of documents relative to selected physical locations and detecting a batch of documents at a specific physical location at a selected time period is inconsistent with such physical location.

13. The method of claim 1 comprising the step of detecting whether a batch of documents is checked out from a physical location that is not compatible with check out.

14. The method of claim 1 comprising the steps of:
    a. separating the document images for a batch of documents into selected sub-batches based on selected processing criteria;
    b. tracking the sub-batches of document images during processing;
    c. identifying the batch of documents as being processed once all of the sub-batches are completely processed.

15. The method of claim 1, comprising the steps of:
    a. separating the document images for a batch of documents into selected sub-batches based on selected processing criteria;
    b. tracking the sub-batches of document images during processing;
    c. correlating the physical location of the batch of documents with the processing of the sub-batches of document images.

16. The method of claim 1 wherein the step of assigning a unique batch identifier to the batch of documents to distinguish a batch of documents from any other batches includes providing pre-printed batch tickets having the unique batch identifier printed thereon and scanning the pre-printed batch ticket prior to imaging documents in the batch to associate the unique batch identifier with the documents to be imaged for that batch.

17. The method of claim 16 including calculating the time difference between the scanning of successive batch tickets to provide a time reflective of labor required for the preparation of a batch.

18. The method of claim 1 wherein the step of assigning a unique batch identifier to the batch of documents includes printing a unique batch ticket bearing a unique batch identifier to be placed with a selected batch of documents.

19. The method of claim 18 including the steps of starting a timer at the beginning of document preparation for prior to imaging of the documents and calculating the time between the start of the timer and the printing of the batch ticket to provide an amount of time for document preparation.

20. The method of claim 1 including the step of determining the number of pages in a particular batch to provide throughput tracking.

21. A method for tracking documents, comprising the steps of:
   a. imaging documents having unique document identifiers to produce electronic images of the documents;
   b. reading the unique document identifiers from the electronic images and linking the unique document identifiers to their respective documents and their respective electronic images;
   c. processing the electronic images according to a set of image processes and providing an electronic status of the image processes associated with the electronic images;
   d. monitoring the physical location of the documents by detecting the unique document identifiers of the documents as documents are moved to selected locations and providing a physical status associated with the physical location of the documents;
   e. analyzing the electronic status and the physical status for compliance with a selected set of conditions;
   f. reporting whether the electronic status and physical status for the documents are in compliance with the selected set of conditions; and
   g. detecting whether a batch of the documents is checked out of a physical location for a time period that exceeds a selected time limit for check out.

22. The method of claim 21 comprising the steps of identifying any document as a reject when the document image for such document fails to meet selected processing criteria and determining whether any document in a batch is a reject.

23. The method of claim 22, comprising the steps of reading the unique batch identifier for a batch at the physical location of the batch to determine if any documents in the batch have been identified as a reject.

24. The method of claim 22, comprising the step of providing a physical location of the batch containing documents identified as a reject.

25. The method of claim 24, including the step of providing the location of the document in the batch.

26. The method of claim 22, comprising of the step of displaying an image of a document in a batch that has been identified as a reject.

27. A method for tracking documents having unique document identifiers, comprising the steps of:
   a. imaging documents to provide document images of the documents;
   b. assigning unique document identifiers in association with selected documents and their document images;
   c. assigning an electronic processing status for the documents corresponding to one or more electronic processing steps that operate on the document images;
   d. assigning a physical location status for the documents corresponding to a physical location of the documents upon detection of the unique document identifiers from the documents at such physical location of the documents;
   e. associating the electronic processing status with the physical location of documents and reporting the associated electronic processing status and physical location to a user;
   f. preventing further processing of the documents or the electronic images of The documents when at least one of the electronic processing status and The physical location status for the documents is not in compliance with a selected set of conditions; and
   g. detecting whether a batch of the documents is checked out of a physical location for a time period that exceeds a selected time limit for check out.

* * * * *